US007046803B2

(12) United States Patent
Lee et al.

(10) Patent No.: US 7,046,803 B2
(45) Date of Patent: May 16, 2006

(54) RANDOM KEYSTREAM GENERATION APPARATUS AND METHOD FOR USE IN AN ENCRYPTION SYSTEM

(75) Inventors: Hoon-Jae Lee, Taegu-Kwangyokshi (KR); Sang-Jae Moon, Taegu-Kwangyokshi (KR); Sang-Jun Park, Seoul (KR)

(73) Assignee: Samsung Electronics Co., Ltd., (KR)

( * ) Notice: Subject to any disclaimer, the term of this patent is extended or adjusted under 35 U.S.C. 154(b) by 916 days.

(21) Appl. No.: 10/114,088

(22) Filed: Apr. 2, 2002

(65) Prior Publication Data

US 2003/0068039 A1    Apr. 10, 2003

(51) Int. Cl.
*H04L 9/00* (2006.01)
*G06F 1/02* (2006.01)

(52) U.S. Cl. .................... 380/44; 380/265; 708/252
(58) Field of Classification Search .............. 380/44, 380/46, 265, 268; 708/250, 252, 253; 377/72
See application file for complete search history.

(56) References Cited

U.S. PATENT DOCUMENTS

| 4,965,881 | A | * | 10/1990 | Dilley | ...................... | 380/268 |
| 5,745,522 | A | * | 4/1998 | Heegard | .................. | 380/46 |
| 5,910,907 | A | * | 6/1999 | Chen et al. | .................. | 708/313 |
| 6,763,363 | B1 | * | 7/2004 | Driscoll | ...................... | 708/252 |
| 2001/0024502 | A1 | * | 9/2001 | Ohkuma et al. | .............. | 380/46 |

OTHER PUBLICATIONS

Popplewell et al., "Architecture for fast encoding and error detection of cyclic codes", Jun. 1992, IEEE Proceedings-1, vol. 139, No. 3, pp. 340-348.*

* cited by examiner

*Primary Examiner*—Matthew Smithers
*Assistant Examiner*—Minh Dieu Nguyen
(74) *Attorney, Agent, or Firm*—Dilworth & Barrese, LLP

(57) ABSTRACT

A random keystream generation apparatus and method for use in an encryption system, generates an m-bit random keystream, using a PS-LFSR with n storage stages for storing n-bit binary data is divided into k sub-storages connected in series, each sub-storage having parallel storage stages (k is a minimum integer larger than the quotient of n divided by m). Each sub-storage stores in the parallel storage stages m-bit parallel binary data received from the previous sub-storage and outputs the m-bit parallel binary data simultaneously in accordance with a system clock signal. A buffer has m storage stages to store m-bit parallel data received from the last sub-storage of the PS-LFSR. M feedback connections receive the outputs of the sub-storages and the buffer corresponding to predetermined primitive polynomials, calculate the primitive polynomials with the received data, and output the calculation results as the bits of the m-bit keystream sequence.

8 Claims, 4 Drawing Sheets

RANDOM KEYSTREAM GENERATION APPARATUS AND METHOD FOR USE IN AN ENCRYPTION SYSTEM

PRIORITY

This application claims priority to an application entitled "Random Keystream Generation Apparatus and Method for use in a Crypto System" filed in the Korean Industrial Property Office on Oct. 6, 2001 and assigned Serial No. 2001-61691, and an application entitled "Random Keystream Generation Apparatus and Method for use in a Crypto System" filed in the Korean Industrial Property Office on Jan. 21, 2002 and assigned Serial No. 2002-3309, the contents of which are hereby incorporated by reference.

BACKGROUND OF THE INVENTION

1. Field of the Invention

The present invention relates generally to a crypto system, and in particular, to a random keystream generation apparatus and method for encrypting input information using an LFSR (Linear Feedback Shift Register).

2. Description of the Related Art

Along with the recent rapid development of communication networks, text/voice data has given place to multimedia data for video conferencing, moving pictures, etc. in data processing. Accordingly, communication systems require encryption algorithms that ensure high-level security, high speed and high reliability.

For encryption, there are stream ciphers, block ciphers, and public-key ciphers. The block ciphers operate in four modes: ECB (Electronic CodeBook), CFB (Cipher FeedBack), CBC (Cipher Block Chaining), and OFB (Output FeedBack). The ECB mode takes a block of plaintext and outputs a block of ciphertext using a secret key and a DES (Data Encryption Standard) function. In the CFB mode, an output ciphertext is fed back to the input. In the CBC mode, each ciphertext block is XORed with the next plaintext block to be encrypted for authentication of transmission/ reception data, and then input to a block cipher. The resulting new output is XORed with the next input. After repeating this operation, a final authentication value is achieved. With the final authentication value, unauthorized data manipulation can be detected. In the OFB mode, a block cipher becomes a random stream generator, serving as a stream cipher.

No block cipher in the above four modes of operation is practically applicable for real encrypted communications because the block ciphers are mostly vulnerable to channel errors or have other problems. In the ECB mode, one or more bit errors in a single ciphertext block affects the deciphering of that block only. In the CFB mode, a single bit error in a ciphertext block affects deciphering of that block and the next block. In the CBC mode, a bit error in a ciphertext block affects all subsequent ciphertext blocks. The OFB mode is used for applications in which error propagation of block ciphers must be avoided. The OFB mode reduces error propagation by the number of input feedback bits less than a block size. In the best case, it can radically prevent error propagation by feeding back one bit. However, the one-bit OFB mode is slower in data processing than the ECB mode by one block size, thereby decreasing the throughput of a communication network.

The public-key ciphers are not suited for high-speed data processing because they are slow and are similar to the ECB mode in that errors are propagated in a whole block.

Meanwhile, the stream ciphers have the advantages of no channel error propagation, mathematically assured security in several aspects, and high speed processing. However, the capability of the stream ciphers to reliably encrypt information for ultrahigh speed communication service is questionable.

The basic components of implementing a stream cipher are LFSRs, logical combination circuits implemented in the form of non-linear combining functions, full adders, multiplexers, etc. In particular, LFSRs are essential to encryption systems because they are implemented in diverse sizes and determine a security factor, the period of a keystream. FIG. 1 depicts an LFSR 10. Referring to FIG. 1, the LFSR 10 generates a binary keystream, moving data by one bit at a time in synchronization to an external system clock signal. Also shown is feedback connection 20. The keystream is applied to the input of an encryption combiner (not shown) for use in encrypting plaintext to ciphertext. The speed at which the keystream is generated depends on the system clock signal and the delay time of an internal circuit.

The LFSR 10 as shown in FIG. 1 is a basic component needed for PN (Pseudo Noise) code generation or encryption. Especially as multimedia data has emerged as an object to be encrypted, high-speed LFSR implementation is necessary. However, since existing LFSR structures allow only one-bit data shift at one time in response to a system clock signal, they are ill-suited to high-speed LFSR implementation.

SUMMARY OF THE INVENTION

It is, therefore, an object of the present invention to provide an apparatus and method for rapidly generating a keystream for use in an encryption system or a spectrum spread communication system.

It is another object of the present invention to provide an apparatus and method for reducing time delay in encrypting a large amount of data in real time due to multiple computations by use of a high-speed LFSR.

It is a further object of the present invention to provide an apparatus and method for preventing error propagation on a communication channel in an encryption system or a spread spectrum communication system.

The foregoing and other objects of the present invention are achieved by providing random keystream generation apparatus and method for use in an encryption system. To generate an m-bit random keystream, a parallel shifting LFSR (PS-LFSR) with n storage stages for storing n-bit binary data is divided into k sub-storages (k is a minimum integer larger than the quotient of n divided by m). Each sub-storage stores m-bit parallel binary data received from the previous sub-storage and outputs the m-bit parallel binary data simultaneously in accordance with a system clock signal. A buffer has m storage stages to store m-bit parallel data received from the last sub-storage of the PS-LFSR. M feedback connections receive the outputs of the sub-storages and the buffer corresponding to predetermined primitive polynomials, calculate the primitive polynomials with the received data, and output the calculation results as the bits of the m-bit keystream sequence.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described hereinbelow with reference to the accompanying drawings. In the following description, well-known functions or constructions are not described in detail since they would obscure the invention in unnecessary detail.

For the purposes of designing an ultrahigh-speed encryption system and an encryption system that prevents error propagation on a communication channel, the present invention proposes a PS-LFSR operated with the advantages of both stream ciphers and block ciphers, and a random keystream generating apparatus using the PS-LFSR. The proposed random keystream generating apparatus enables high-speed encryption by realizing the m-bit parallel processing function of the block ciphers and maintaining the security level and error propagation prevention capability of the stream ciphers. In accordance with the present invention, an m-bit shift at each clock time is possible as compared to the stream ciphers that allow only one-bit shift at each clock time. The present invention further proposes a general form of m-bit parallel non-linear combining function that outputs a plurality of bits simultaneously as in a block cipher by overcoming the disadvantages of a non-linear combining function that operates on a one-bit basis.

Figure 2:
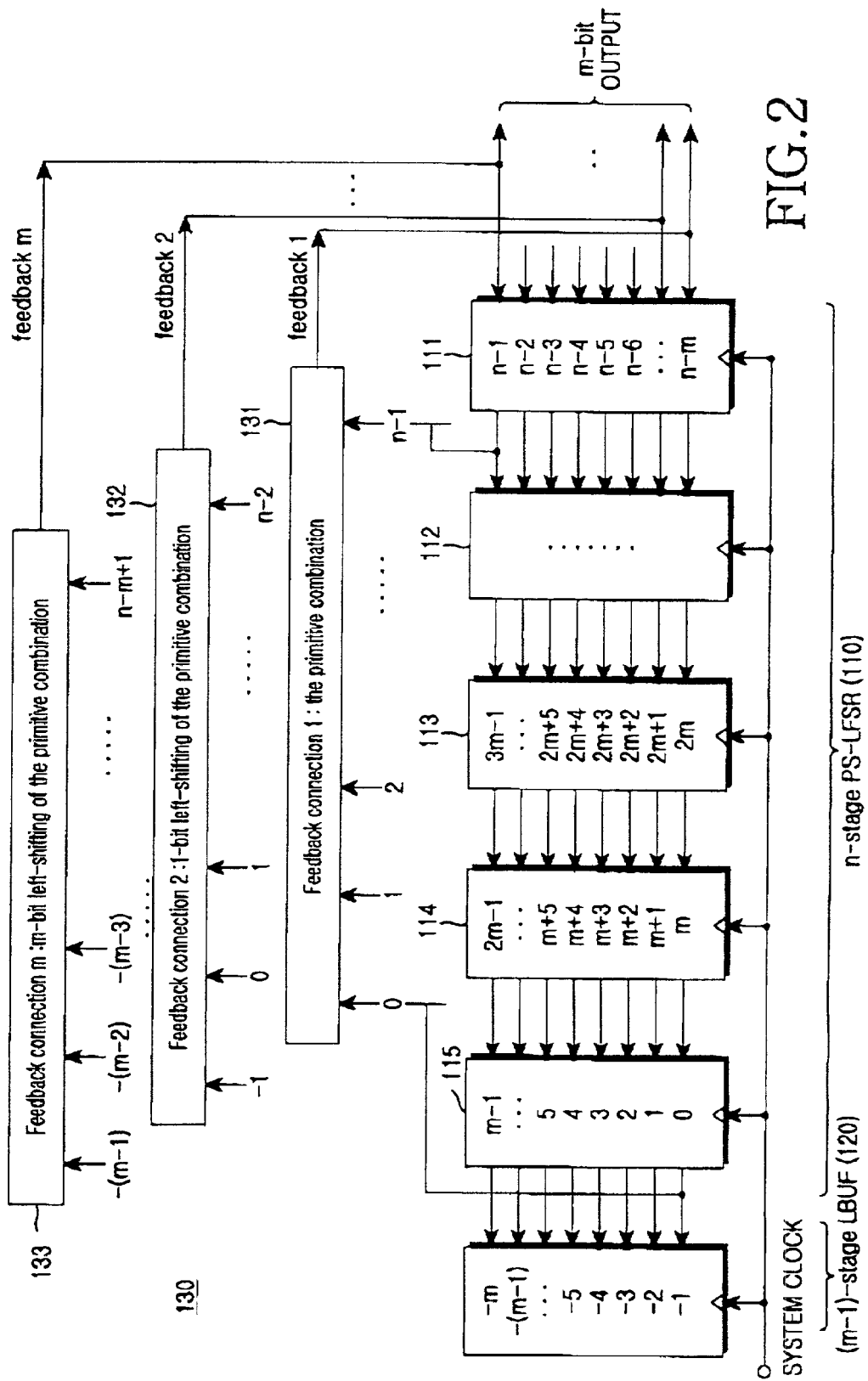
FIG. 2 is a block diagram of a random keystream generating apparatus using an (n, m) parallel shifting LFSR (PS-LFSR) according to an embodiment of the present invention.

FIG. 2 is a block diagram of a random keystream generating apparatus using an (n, m) PS-LFSR according to the present invention.

Figure 1:
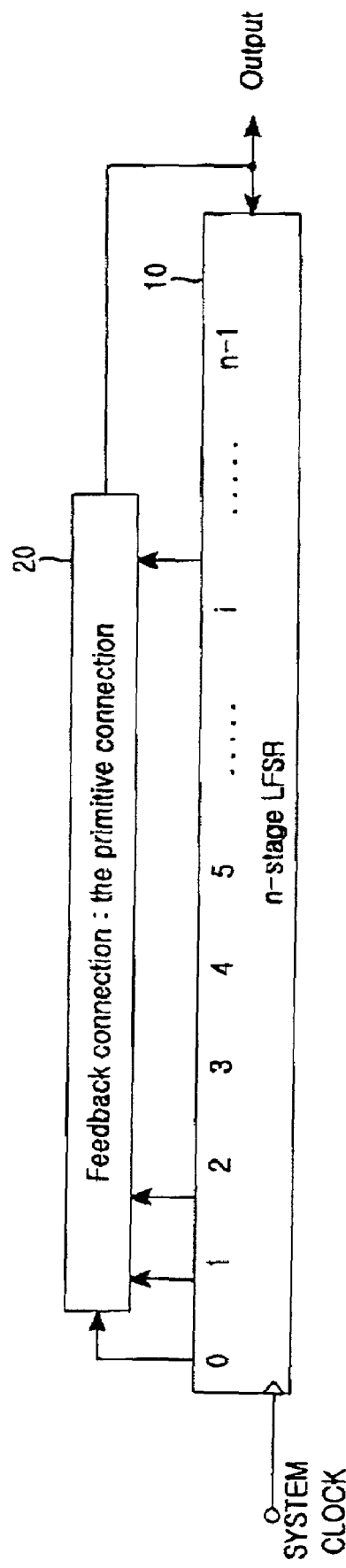
FIG. 1 is a block diagram of a conventional random keystream generating apparatus using an LFSR.
Figure 3:
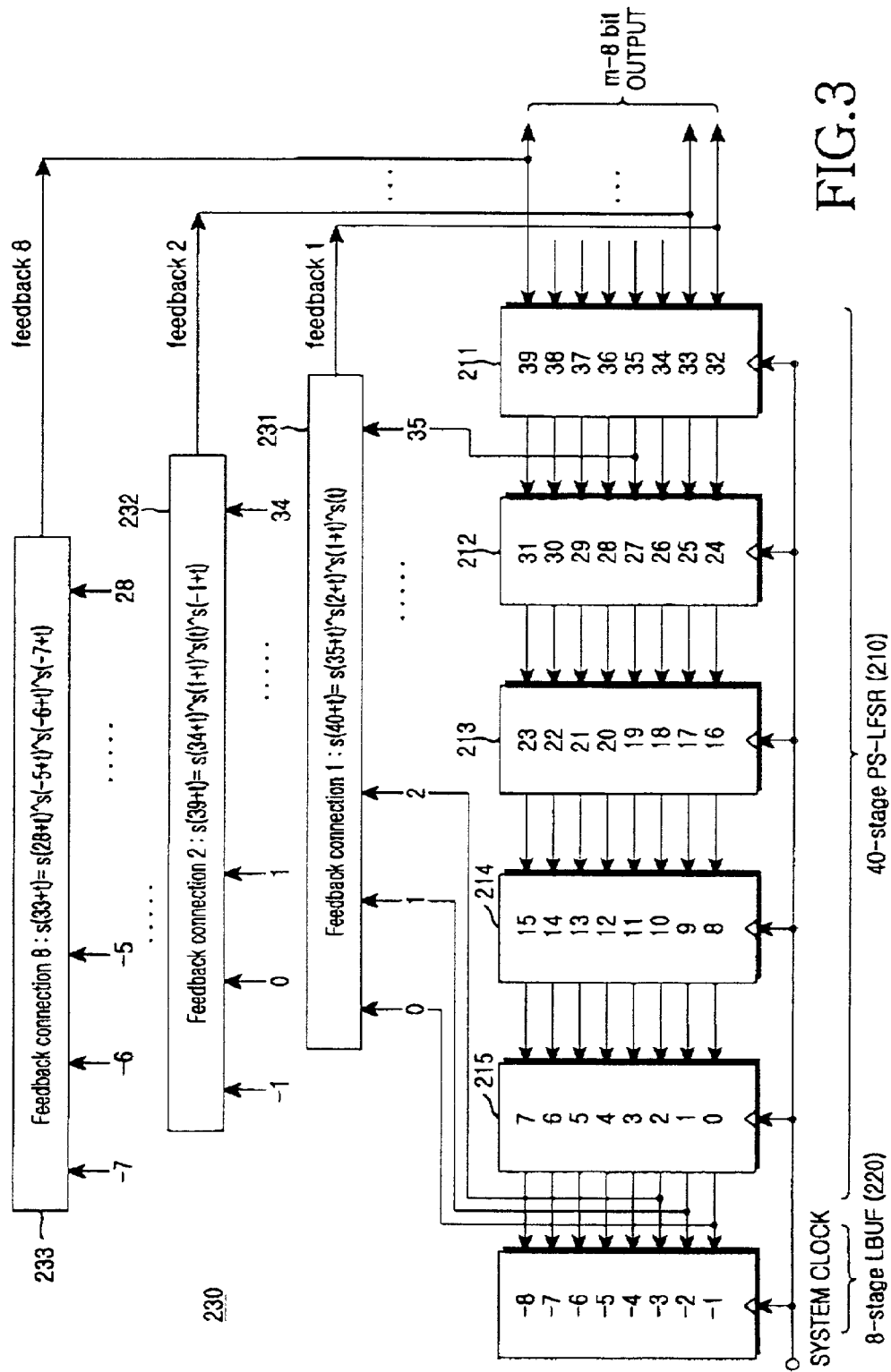
FIG. 3 is a block diagram of a random keystream generating apparatus using a (40, 8) PS-LFSR according to an embodiment of the present invention.
Figure 4:
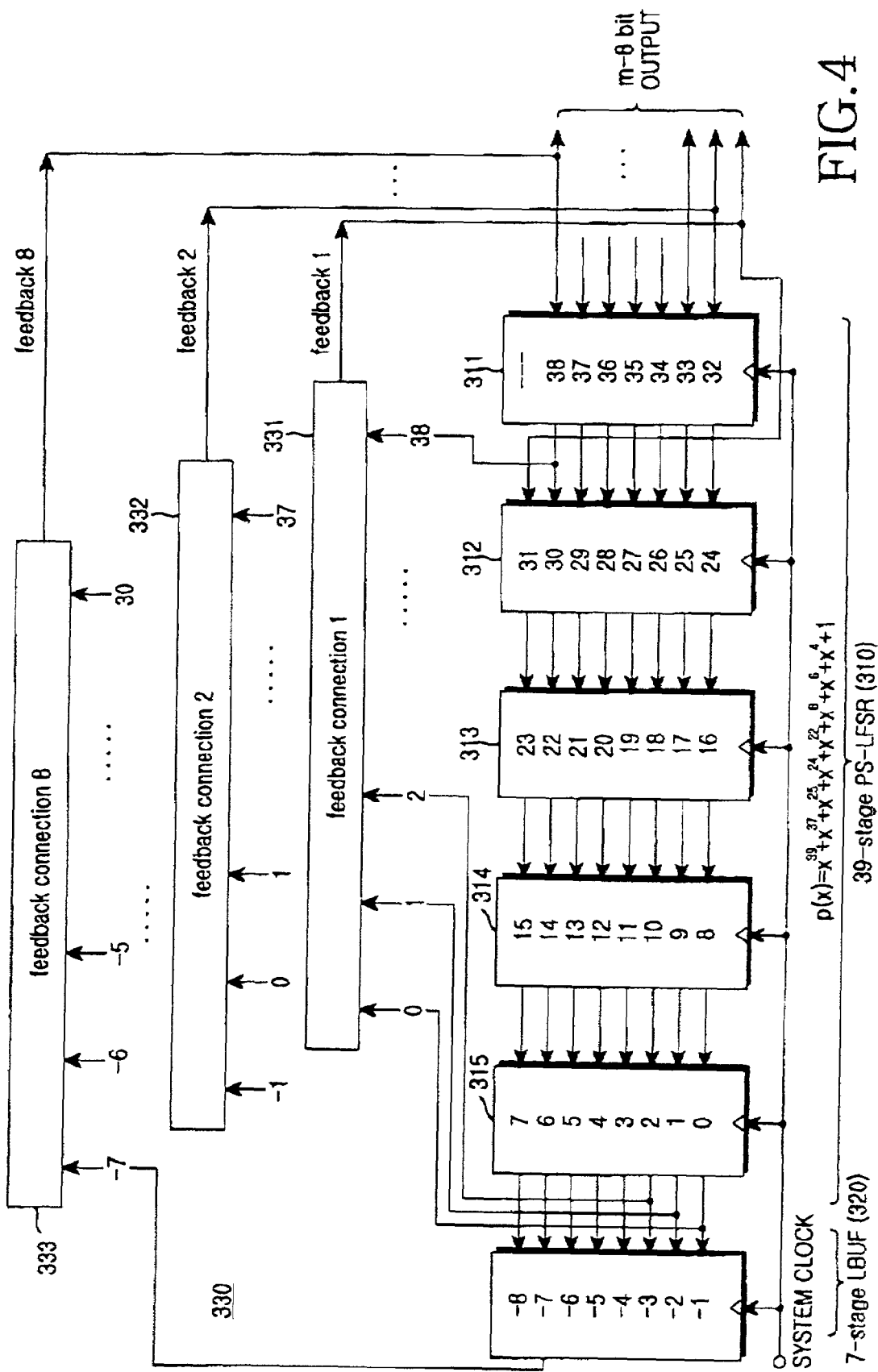
FIG. 4 is a block diagram of a random keystream generating apparatus using a (39, 8) PS-LFSR according to another embodiment of the present invention.

Referring to FIG. 2, the keystream generating apparatus for generating an m-bit random keystream includes a PS-LFSR 110, a buffer 120, and a feedback connection unit 130. The PS-LFSR 110 has n storage stages to store n-bit binary data like the conventional LFSR 10 shown in FIG. 1. The PS-LFSR 110 is divided into a predetermined number of (k) sub-storages. Each sub-storage includes m parallel storage stages. This structure allows the parallel shift, that is, concurrent storage and output of m-bit binary data within one period of a system clock signal. If n and m are given, k is a minimum integer larger than the quotient of n divided by m. For example, for n=40 and m=8, k=5. The sub-storages have the same number of (m) storage stages in this case. If n=39 and m=8, k is a minimum integer, i.e. 5 larger than the quotient 4.875 of 39 divided by 8. In this case, at least one sub-stage has less storage stages than the other sub-stages. Random keystream generating apparatuses in the above two cases are illustrated in FIGS. 3 and 4. Those keystream generating apparatuses can be implemented in software or in hardware and used as keystream generators for a communication system adopting a stream cipher. While the use of a keystream generating apparatus as a keystream generator for a stream cipher-using communication system will be described in the embodiment of the present invention, it is to be noted that the keystream generating apparatus can also be used as a keystream generator for a spread spectrum communication system.

Returning to FIG. 2, the PS-LFSR 110 has k sub-storages 111 to 115. The sub-storage 111 is comprised of the first m storage stages n−1, n−2, n−3, n−4, n−5, ..., n−m among the n storage stages. The sub-storage 113 is comprised of the second m storage stages 3m−1, ..., 2m+5, 2m+4, 2m+3, 2m+2, 2m+1, 2m among the n storage stages. The sub-storage 114 is comprised of the third m storage stages 2m−1, ..., m+5, m+4, m+3, m+2, m+1, m among the n storage stages. The sub-storage 115 is comprised of the last m storage stages m−1, ..., 5, 4, 3, 2, 1, 0 among the n storage stages. The storage stages are arranged in parallel in each sub-storage. Therefore, each sub-storage stores m-bit parallel binary data received from the previous sub-storage concurrently and outputs the m-bit data in accordance with a system clock signal.

The buffer 120 is comprised of m storage stages −m, −(m−1), ..., −5, −4, −3, −2, −1 to store and output m-bit parallel binary data simultaneously received from the last sub-storage 115. Here, the value of the first storage stage −m is not used for the feedback connection unit 130. In other words, the buffer 120 may be implemented with (m−1) storage stages. The buffer 120 is used to store storage stage values for the next period of the system clock signal.

The feedback connection unit 130 includes m feedback connections 131 to 133. The feedback connections 131 to 133 compute predetermined respective primitive polynomials with the outputs of the sub-storages 111 to 115 and the buffer 120 and output the computation results as the bits of a keystream sequence. The feedback connections 131 to 133 can be realized using XOR gates.

If an initial primitive polynomial is determined for the feedback connection 131, the feedback connection 132 computes a primitive polynomial produced by shifting the initial primitive polynomial left by one bit, and the feedback connection 133 computes a primitive polynomial produced by shifting the initial primitive polynomial left by m bits. Thus, if the feedback connection 131 receives the outputs of the storage stages 0 to (n−1), the feedback connection 132 computes its primitive polynomial with the outputs of the storage stages −1 to (n−2), and the feedback connection 133 computes its primitive polynomial with the outputs of the storage stages −(m−1) to (n−m+1). Then, the feedback connection 131 outputs the first feedback value feedback 1, the feedback connection 132 outputs the second feedback value feedback 2, and the feedback connection 133 outputs the mth feedback value feedback m. The feedback values are applied to corresponding storage stages in the sub-storage 111 for the next keystream generation. The first feedback value feedback 1 through the mth feedback value feedback m are applied to the inputs of the storage stages (n−m) through (n−1) of the sub-storage 111, respectively. When the feedback values are output, they form an m-bit keystream for use in encryption.

The random keystream generating apparatus shown in FIG. 2 generates an m-bit random keystream as follows:

(Step 1) The PS-LFSR 110 having n storage stages for storing n-bit binary data is divided into the k sub-storages 111 to 115 (k is a minimum integer larger than the quotient of n divided by m).

(Step 2) Each sub-storage stores m-bit parallel binary data received from the previous sub-storage simultaneously and outputs them according to a system clock signal.

(Step 3) The buffer 120 buffers m-bit parallel binary data received from the last sub-storage 115.

(Step 4) The feedback connection 131 receives the outputs of the sub-storage 111 to 115 corresponding to the initial primitive polynomial, computes the primitive polynomial, and outputs the first feedback value feedback 1.

(Step 5) (m−1) primitive polynomials are generated by shifting the initial primitive polynomial left by one bit at each time. These (m−1) primitive polynomials are used for the (m−1) feedback connections 132 to 133.

(Step 6) The feedback connections 132 to 133 receive the outputs of the sub-storages 111 to 115 and the buffer 120 corresponding to the (m−1) primitive polynomials, compute the (m−1) primitive polynomials, and output (m−1) feedback values feedback 2 to feedback m.

(Step 7) The m feedback values form an m-bit keystream sequence.

Parallel paths are defined to allow parallel shifting on an m-bit basis in the random keystream generating apparatus using a PS-LFSR according to the present invention. Each feedback connection (tap) also performs a set of m XOR operations and feeds the result to the rightmost register 111. At the next system clock time, the m-bit block in each register is shifted left. This random keystream generating apparatus generates an m-bit output (or an output of bits less than m) concurrently with m-bit shifting at each system clock time. Since an output stream of a long period is used only once, the PS-LFSR has the same security characteristics including random characteristics and period as the typical LFSR shown in FIG. 1. The PS-LFSR encrypts data m times faster than the LFSR generating a bit-basis output. While hardware complexity may be increased to realize high-speed encryption, the increase is negligibly small from the perspective of the recent development of integrated circuit technology.

FIG. 3 is a block diagram of a random keystream generating apparatus using a (40, 8) PS-LFSR according to an embodiment of the present invention. The (40, 8) PS-LFSR is an example of (n, m) PS-LFSR with n=km.

Referring to FIG. 3, the keystream generating apparatus is designed to generate 8-bit keystreams. The keystream generating apparatus includes a PS-LFSR 210, a buffer 220, and a feedback connection unit 230. The PS-LFSR 210 has 40 storage stages for storing 40-bit binary data. The PS-LFSR 210 is divided into a predetermined number of (k=5) sub-storages and eight storage stages are arranged in parallel in each sub-storage. The thus-constituted PS-LFSR 210 shifts 8-bit binary data in parallel for one period of a system clock signal, and stores and outputs them concurrently.

The PS-LFSR 210 is comprised of five sub-storages 211 to 215. Each sub-storage includes eight storage stages (m=8). The sub-storage 211 has the first eight storage stages 32 to 39 among the 40 storage stages. The sub-storage 212 has the second eight storage stages 24 to 31 among the 40 storage stages. The sub-storage 213 has the third eight storage stages 16 to 23 among the 40 storage stages. The sub-storage 214 has the fourth eight storage stages 8 to 15 among the 40 storage stages. The sub-storage 215 has the last eight storage stages 0 to 7 among the 40 storage stages. The storage stages are arranged in parallel in each sub-storage, so that each sub-storage stores 8-bit parallel binary data received from the previous sub-storage and outputs its stored 8-bit parallel binary data in accordance with a system clock signal.

The buffer 220 includes eight storage stages −8 to −1 to store and output 8-bit parallel binary data simultaneously received from the last sub-storage 215. Here, the first storage stage −8 of the buffer 220 is not used. In other words, the buffer 220 can be implemented with seven storage stages.

The buffer 220 functions to store the values of storage stages to be used for the next period of the system clock signal.

The feedback connection unit 230 includes eight feedback connections 231 to 233. Only three feedback connections are shown for simplicity, i.e., feedback connections 1, 2 and 8. Feedback connections 3–7 are assumed but, again, are not shown for simplicity. The feedback connections 231 to 233 calculate their respective predetermined primitive polynomials by which a keystream is generated. They receive the outputs of the sub-storages 211 to 215 and the outputs of the buffer 220 corresponding to the primitive polynomials and output calculation results as the bits of a keystream sequence. The feedback connection 232 computes a primitive polynomial produced by shifting a predetermined initial primitive polynomial for the feedback connection 231 left by one bit and the feedback connection 233 computes a primitive polynomial produced by shifting the initial primitive polynomial left by eight bits. If the values of the storage stages 0 to 35 are applied to the input of the feedback connection 231, the feedback connection 232 computes its primitive polynomial for the input of the values of the storage stages −1 to 34, and the feedback connection 233 computes its primitive polynomial for the input of the values of the storage stages −7 to 28. Suppose that the initial primitive polynomial for the feedback connection 231 is $s(40+t)=s(35+t)\hat{\ }s(2+t)\hat{\ }s(1+t)\hat{\ }s(t)$ where $\hat{\ }$ indicates the XOR operation. Then, the feedback connection 232 computes $s(39+t)=s(34+t)\hat{\ }s(1+t)\hat{\ }s(t)\hat{\ }s(-1+t)$ and the feedback connection 233 computes $s(33+t)=s(28+t)\hat{\ }s(-5+t)\hat{\ }s(-6+t)\hat{\ }s(-7+t)$.

The feedback connection 231 outputs the first feedback value feedback 1, the feedback connection 232 outputs the second feedback value feedback 2, and the feedback connection 233 outputs the eighth feedback value feedback 8. The feedback values are fed back to corresponding storage stages in the PS-LFSR 210. The first feedback value feedback 1 is input to the storage stage 32, the second feedback value feedback 2 is input to the storage stage 33, and the eighth feedback value feedback 8 is input to the storage stage 39. Feedback stages 3–7 (not shown), are input to the storages 34–38, respectively. When the feedback values are output, they form an 8-bit keystream sequence.

FIG. 4 is a block diagram of a random keystream generating apparatus using a (39, 8) PS-LFSR according to another embodiment of the present invention. The (39, 8) PS-LFSR is an example of (n, m) PS-LFSR with n≠km (k is an integer).

Referring to FIG. 4, the keystream generating apparatus is designed to generate 8-bit keystreams. The keystream generating apparatus includes a PS-LFSR 310, a buffer 320, and a feedback connection unit 330. The PS-LFSR 310 has 39 storage stages for storing 39-bit binary data. The 39 storage stages are grouped into a predetermined number of sub-storages (k=5).

The PS-LFSR 310 is comprised of five sub-storages 311 to 315. At least one of the sub-storages 311 to 315 includes storage stages the number of which is different from that of each of the other sub-storages. For example, the sub-storage 311 has seven storage stages and each of the other sub-storages 312 to 315 has eight storage stages. The sub-storage 311 has the first seven storage stages 32 to 38 among the 39 storage stages. The sub-storage 312 has the following eight storage stages 24 to 31 among the 39 storage stages. The sub-storage 313 has another eight storage stages 16 to 23 among the 39 storage stages. The sub-storage 314 has eight storage stages 8 to 15 among the 39 storage stages. The sub-storage 315 has the last eight storage stages 0 to 7 among the 39 storage stages. The storage stages are arranged in parallel in their sub-storages, so that each sub-storage stores 7- or 8-bit parallel binary data received from the previous sub-storage and outputs its stored 7- or 8-bit parallel binary data in accordance with a system clock signal.

The buffer 320 includes eight storage stages −8 to −1 to store and output 8-bit parallel binary data simultaneously received from the last sub-storage 315. Here, the first storage stage −8 of the buffer 220 is not used. In other words, the buffer 320 can be implemented with seven storage stages. The buffer 320 functions to store the values of storage stages to be used for the next period of the system clock signal.

The feedback connection unit 330 includes eight feedback connections 331 to 333. Only three feedback stages are shown for simplicity. The feedback connections 331 to 333 calculate their respective predetermined primitive polynomials by which a keystream is generated. They receive the outputs of the sub-storages 311 to 315 and the outputs of the buffer 320 corresponding to the primitive polynomials and output calculation results as the bits of a keystream sequence. The feedback connection 332 computes a primitive polynomial produced by shifting a predetermined initial primitive polynomial for the feedback connection 331 left by one bit and the feedback connection 333 computes a primitive polynomial produced by shifting the initial primitive polynomial left by eight bits. If the values of the storage stages 0 to 38 are applied to the input of the feedback connection 331, the feedback connection 332 computes the primitive polynomial for the input of the values of the storage stages −1 to 37, and the feedback connection 333 computes the primitive polynomial for the input of the values of the storage stages −7 to 30. Suppose that the primitive polynomial for the feedback connection 331 is $p(x)=x^{39}+x^{37}+x^{25}+x^{24}+x^{22}+x^8+x^6+x^4+1$. Then, the feedback connection 332 computes $p(x)=x^{38}+x^{36}+x^{24}+x^{23}+x^{21}+x^7+x^5+x^3+x^{-1}$ and the feedback connection 333 computes $p(x)=x^{32}+x^{30}+x^{18}+x^{17}+x^{15}+x^1+x^{-1}+x^{-3}+x^{-6}$.

The feedback connection 331 outputs the first feedback value feedback 1, the feedback connection 332 outputs the second feedback value feedback 2, and the feedback connection 333 outputs the eighth feedback value feedback 8. Feedback connections 3–7 (not shown) output the third through seventh feedback values. The feedback values are fed back to corresponding storage stages in the PS-LFSR 210. The first feedback value feedback 1 is input to the storage stage 31, the second feedback value feedback 2 is input to the storage stage 32, and the eighth feedback value feedback 8 is input to the storage stage 38. Feedback values 3–7 (not shown) one input to the storage stages 33–37, respectively. When the feedback values are output, they form an 8-bit keystream sequence.

In accordance with the present invention as described above, the use of a high-speed LFSR remarkably reduces time delay involved in real-time encryption of a large amount of data by a large volume of computation.

While the invention has been shown and described with reference to certain preferred embodiments thereof, it will be understood by those skilled in the art that various changes in form and details may be made therein without departing from the spirit and scope of the invention as defined by the appended claims.

What is claimed is:
1. An m-bit random keystream generating apparatus for use in an encryption system, comprising:
   a PS-LFSR (Parallel Shift-Linear Feedback Shift Register) with n storage stages for storing n-bit binary data, said n storage stages each divided into k sub-storages connected in series, each sub-storage having parallel storage stages, each sub-storage storing in said parallel storage stages m-bit parallel binary data received from a previous sub-storage and outputting the m-bit parallel binary data simultaneously in accordance with a system clock signal, wherein k is a minimum integer greater than the quotient of n divided by m;
   a buffer having m storage stages for storing m-bit parallel data received from a last sub-storage of the PS-LFSR; and
   m feedback connections for receiving the outputs of the sub-storages and the buffer corresponding to predetermined primitive polynomials, calculating the primitive polynomials with the received data, and outputting the calculation results as the bits of a keystream.

2. The m-bit random keystream generating apparatus of claim 1, wherein a first storage stage of the buffer is not used.

3. The m-bit random keystream generating apparatus of claim 1, wherein each sub-storage has the same number of parallel storage stages.

4. The m-bit random keystream generating apparatus of claim 1, wherein at least one of the sub-storages has a number of parallel storage stages less than the other sub-storages.

5. An m-bit random keystream generating method for use in an encryption system, comprising the steps of:
   dividing a PS-LFSR with n storage stages for storing n-bit binary data into k sub-storages connected in series, each sub-storage having parallel storage stages wherein k is a minimum integer greater than the quotient of n divided by m, and m is the number of bits in parallel binary data contained in the keystream;
   receiving m-bit parallel binary data from a previous sub-storage and outputting the m-bit parallel binary data simultaneously from each of the sub-storages in accordance with a system clock signal;
   buffering in a buffer having m storage stages m-bit parallel data received from a last sub-storage of the PS-LFSR in a buffer; and
   receiving the outputs of sub-storages corresponding to a predetermined primitive polynomial, calculating the primitive polynomial with the received data, and outputting the calculation result as a first feedback value;
   generating (m−1) primitive polynomials by shifting the predetermined primitive polynomial to the left by one bit at a time;
   receiving the outputs of the sub-storages and the buffered m-bit parallel data corresponding to the (m−1) primitive polynomials, calculating the primitive polynomials with the received data, and outputting the (m−1) calculation results as (m−1) feedback values; and
   outputting the m feedback values as the bits of a keystream.

6. The m-bit random keystream generating method of claim 5, wherein a first storage stage of the buffer is not used.

7. The m-bit random keystream generating method of claim 5, wherein each sub-storage has the same number of parallel storage stages.

8. The m-bit random keystream generating method of claim 5, wherein at least one of the sub-storages has a number of parallel storage stages less than the other sub-storages.

* * * * *

UNITED STATES PATENT AND TRADEMARK OFFICE
CERTIFICATE OF CORRECTION

PATENT NO.         : 7,046,803 B2                                   Page 1 of 1
APPLICATION NO. : 10/114088
DATED              : May 16, 2006
INVENTOR(S)        : Hoon-Jae Lee et al.

It is certified that error appears in the above-identified patent and that said Letters Patent is hereby corrected as shown below:

Title page, item (30) Foreign Application Priority Data: please insert

October 6, 2001  (KR) …… 2001-0061691
January 21, 2002 (KR) …… 2002-0003309

Signed and Sealed this

Twenty-third Day of January, 2007

JON W. DUDAS
*Director of the United States Patent and Trademark Office*